Oct. 19, 1926.
L. KIRSCHMANN
1,603,474
COOLING AND FREEZING VESSEL
Filed Oct. 17, 1924
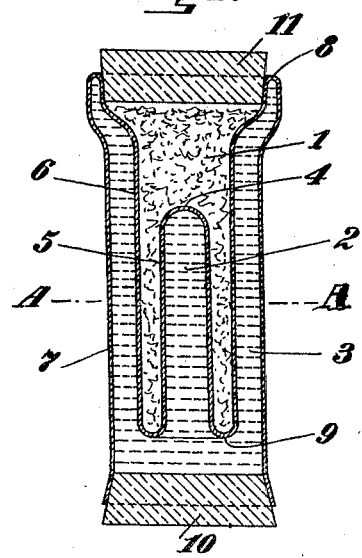
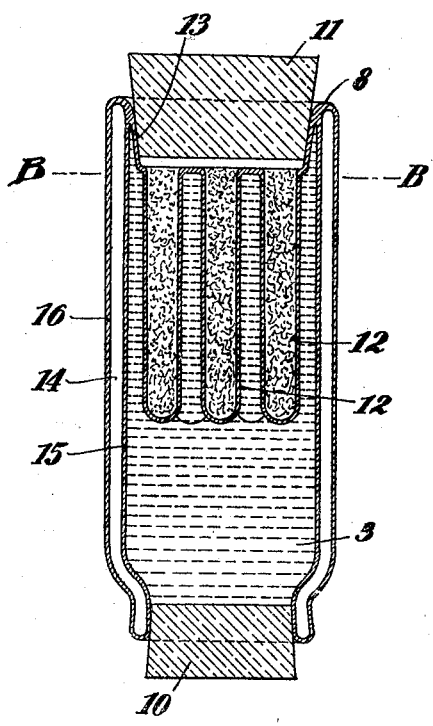
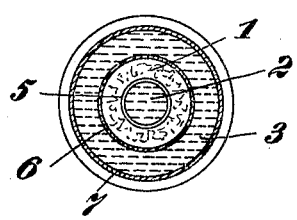
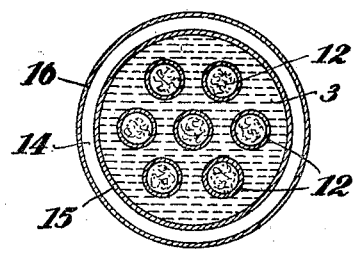

Patented Oct. 19, 1926.

1,603,474

UNITED STATES PATENT OFFICE.

LEOPOLD KIRSCHMANN, OF BERLIN, GERMANY.

COOLING AND FREEZING VESSEL.

Application filed October 17, 1924, Serial No. 744,191, and in Germany September 11, 1924.

In order to makes ices the mass to be frozen is usually filled into a vessel which is placed into a freezing mixture composed of ice and salt. In freezing apparatus of this type it is always possible that some of the freezing mixture gets into the vessel which contains the mass to be frozen which thus acquires a disagreeable salty taste. The invention has for its object to avoid this inconvenience.

According to the invention the orifice through which the mass to be frozen is filled in and the orifice through which the freezing mixture is filled in are situated at opposite sides of the freezing machine, the two vessels being perfectly separated the one from the other, so that contact between the two masses is absolutely prevented. The improved cooling and freezing vessel is not only designed for making ices but also for the cooling of beverages.

Two forms of construction of the improved cooling and freezing vessel are shown, by way of example, on the accompanying drawings in which—

Fig. 1 is a longitudinal section through the cooling and freezing vessel of preferred form of construction.

Fig. 2 is a cross section on line A—A of Fig. 1.

Fig. 3 shows in longitudinal section a cooling and freezing vessel of modified construction.

Fig. 4 is a cross section of Fig. 3.

In the form of construction shown in Figs. 1 and 2 the receptacle 1 for the mass to be cooled or frozen is open at the upper end. The central part 5 of the bottom plate 4 of this receptacle 1 is curved upward so that an upwardly directed hollow space 2 is formed, designed to accommodate a portion of the freezing mixture. The wall of the receptacle 1 is bent downward at the upper end to form an envelope 7 open at the lower end. The envelope 7 is parallel with the wall 6 of the receptacle 1 and stands at a convenient distance from the same so that a space 3 is formed which is designed to hold the freezing mixture. The lower open end of the envelope 7 is closed by a stopper 10, the upper open end of the receptacle 1 being closed by a stopper 11.

The vessel is preferably pressed from one piece of sheet metal which is bent over at 8 and 9. When the vessel is made from glass or other non flexible material the joints 8, 9 are molten together, or they are soldered when the vessel is composed to two separate receptacles made from sheet metal. Owing to the construction of the vessel the two masses, the cream to be frozen and the freezing mixture, are separated the one from the other so that they can never mix. The rapid freezing of the contents of the inner vessel 1 is ensured as the freezing mixture in vessel 3 does not only act upon the outer surface of the cream but also from the centre owing to the central cavity 2.

The vessel is preferably of circular cross section as shown in Fig. 2.

The cooling and freezing vessel shown in Figs. 3 and 4 is of fundamentally similar construction as that shown in Figs. 1 and 2 and composed of a receptacle for the cream or other mass to be cooled or frozen, closed by a stopper 11 and of a receptacle 3 for the freezing mixture closed by a stopper 10. The receptacle for the cream to be frozen is composed of a number of long tubular elements 12 which are all connected with one another at the upper end. These tubular elements 12 are closed at the lower end. The upper edge 13 of the plate of sheet metal from which the vessel is made is bent to form a double outer envelope 15, 16 of the receptacle 3 for the freezing mixture. Between the walls 15, 16 a space is formed which, in the manner known from Dewar-vessels, is evacuated and then airtightly closed to form an insulating envelope.

The inner receptacle composed of a number of tubular elements 12 spaced from one another may be made separate from the outer receptacle, the joint between the two receptacles at the upper edge being airtightly closed in any convenient manner.

The outer receptacle containing the cooling or freezing mixture may further be insulated by an envelope of cork, peat or infusorial earth in which case it is specially adapted for cooling beverages.

I claim:—

1. A cooling and freezing vessel made from a single piece of sheet metal which is bent to form an inner receptacle for the mass to be frozen, said inner receptacle being open at the upper end and having an interior space extending upwardly from the lower end of the inner receptacle, and an outer receptacle for the freezing mixture open at the lower end, said outer receptacle having an approximately vertical wall formed integral with the outer wall of the inner receptacle and connected with the same at the upper edge thereof, and means for closing the open upper and lower ends of the vessel.

2. A cooling and freezing vessel made from one piece of sheet metal which is bent to form an inner receptacle for the mass to be frozen open at the upper end and composed of a number of tubular elements spaced from one another closed at the lower end and connected with one another at the upper end, and an outer receptacle for the freezing mixture open at the lower end, and means for closing the open upper and lower ends of the vessel.

In testimony whereof I affix my signature.

LEOPOLD KIRSCHMANN.